United States Patent Office 2,970,110
Patented Jan. 31, 1961

2,970,110
OLEAGINOUS COMPOSITIONS CONTAINING THIOPHOSPHORYL DERIVATIVES

Ellis Kirby Fields, Chicago, Ill., assignor to Standard Oil Company, Chicago, Ill., a corporation of Indiana No Drawing. Original application May 16, 1956, Ser. No. 585,158, now Patent No. 2,881,196, dated Apr. 7, 1959. Divided and this application Sept. 22, 1958, Ser. No. 762,218

12 Claims. (Cl. 252—32.7)

This invention relates to new thiophosphoryl derivatives of hexachlorocyclopentadiene-unsaturated alcohol adducts and to compositions containing such thiophosphoryl derivatives, and more particularly to lubricant compositions containing said thiophosphoryl derivatives.

An object of the present invention is to provide new and useful thiophosphoryl derivatives of adducts of hexachlorocyclopentadiene and unsaturated alcohols. Another object is to provide compositions containing said thiophosphoryl derivatives. Still another object of the invention is to provide improved lubricant compositions containing said thiophosphoryl derivatives. Other objects and advantages of this invention will become apparent from the following description thereof.

In my co-pending application Serial No. 446,678, filed July 29, 1954, now abandoned, of which my application Serial No. 585,158, filed May 16, 1956, now Patent No. 2,881,196, is a continuation-in-part, there is described the preparation of certain novel derivatives of hexachlorocyclopentadiene and aliphatic organic adducts containing a single carbon-to-carbon double bond which is activated by the presence of a polar group not containing a multiple bond, such as hydroxyl, mercapto, halo, etc., in a position alpha thereto, i.e., attached to a carbon atom adjoining a carbon atom which is part of the carbon-to-carbon double bond. Since only these aliphatic compounds which contain only one carbon-to-carbon double bond are suitable for the herein-described reactions, conjugated or unconjugated diolefins are not included within the scope of this invention. I have found new and useful thiophosphoryl derivatives of the adducts of hexachlorocyclopentadiene and an unsaturated alcohol. The herein described thiophosphoryl derivatives are useful as lubricant additives as well as possessing insecticidal, fungicidal and bactericidal properties. This application is a division of my co-pending application Serial No. 585,158, supra, now Patent No. 2,881,196, in which the thiophosphoryl derivatives, per se, are claimed.

Unsaturated alcohols suitable for use in forming the duct are aliphatic or cyclic alcohols containing 3 to about 60 carbon atoms and 1 to 4 double bonds, such as, for example, allyl alcohol, methallyl alcohol, 3-hydroxy cyclohexene-1, 3-hydroxy cyclopentene-1, vinyl alcohol, 3-cyclohexene-1, 1-dimethanol, 3-cyclohexene-1 methanol, oleyl alcohol, dicyclopentenyl alcohol, 3-hydroxy cyclopentene-1, and the like.

Hexachlorocyclopentadiene may be readily prepared by reacting an aliphatic hydrocarbon containing at least 5 carbon atoms or an alicyclic hydrocarbon containing 5 carbon atoms in the ring, or the chlorinated derivatives of these compounds, with chlorine at temperatures between 350° C. and 550° C. The 5-carbon atom alicyclic hydrocarbons having the 5 carbon atoms in the ring, and 5-carbon aliphatic hydrocarbons wherein the number of carbon atoms in the longest straight chain is 4 or 5 are particularly suitable for the preparation of hexachlorocyclopentadiene in this manner. A detailed description of this method of preparing hexachlorocyclopentadiene is set forth in U.S. 2,509,160 and it is, therefore, considered unnecessary herein to further describe its method of preparation. It should be understood, however, that this invention is in no way directed or limited to any particular method of preparing that compound.

The reaction occurring between hexachlorocyclopentadiene, hereinafter designated $C_5Cl_6$, and the unsaturated alcohols of the type above described appears to proceed in accordance with the Diels-Alder reaction. The adduct formed is illustrated by the following examples:

*Example A*

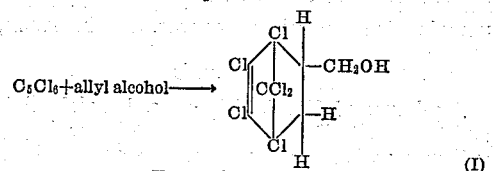

(I)

*Example B*

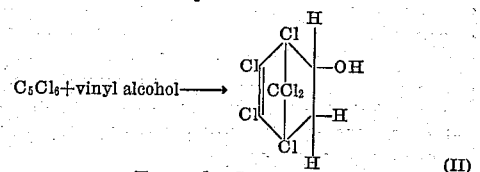

(II)

*Example C*

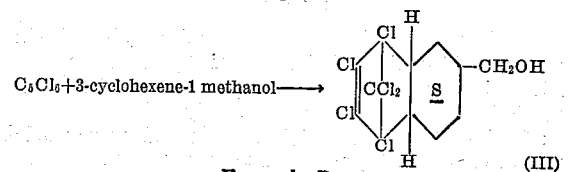

(III)

*Example D*

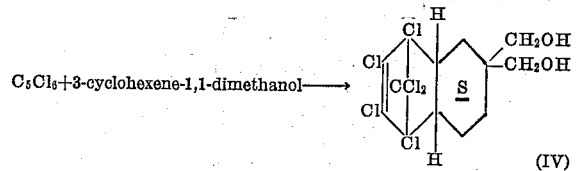

(IV)

The thiophosphoryl derivatives of the above adducts can be prepared by reacting such adducts with $P_2S_5$ or $PSCl_3$ in the mole ratio of 4:1 and 3:1 respectively at a temperature of from about 70° C. to about 150° C. for periods of from 1 to about 24 hours. If desired, solvents such as toluene, xylene, etc. may be used. The resultant thiophosphoryl derivatives can be further reacted with basic reagents such as amines, metal oxides, carbonates, etc. to obtain the corresponding salts. When the thiophosphoryl derivatives are reacted with maleic anhydride, they give, after opening of the anhydride ring, substituted mercapto-succinic acid derivatives.

The thiophosphoryl derivatives of the herein described adducts can be represented by the following general formula:

(A)

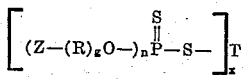

or (B)            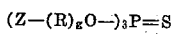

wherein Z represents a hexachloro group selected from the group consisting of

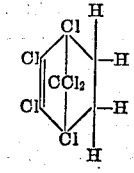     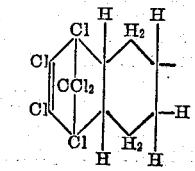

and

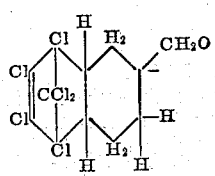

R is an alkylene radical of from 1 to 11 carbon atoms, $g$ is either 0 or 1, $n$ is an integer 1 or 2, T is a constituent selected from the group consisting of hydrogen, amino, a metal, and a succinic acid radical, and $x$ is an integer equivalent to the valence of T. The metal constituent can be an alkali metal, an alkaline earth metal or a polyvalent heavy metal, for example sodium, lithium, calcium, barium, zinc, lead, aluminum, copper, tin, chromium, etc.

*Example I*

A mixture of 68 ml. (58 grams, 1 mole) allyl alcohol and 160 ml. (272.7 grams, 1 mole) hexachlorocyclopentadiene was heated at reflux temperature. The temperature went from 100° C. to 135° C. after 8 hours, where it was kept for 16 hours more. The product was cooled to 75° C. and poured into 500 cc. of hexane, the crystals collected on a filter and dried. There were recovered 314 grams (95% conversion) of 1,4,5,6,7,7-hexachloro-2-hydroxymethyl-bicyclo-(2,2,1)-5-heptene, having a melting point of 165° C. Analysis: Calculated for $C_8H_6OCl_6$: Cl, 64.3; Found: Cl, 64.5.

*Example II*

A mixture of 8.88 grams (0.04 mole) $P_2S_5$ and 52.96 grams (0.16 mole) of the product of Example I was stirred in 150 ml. xylene at 120° C. After 30 minutes the $P_2S_5$ had gone into solution. The mixture was kept at 120° C. for a total of 2½ hours and evaporated in vacuo, giving 60.5 grams of a very viscous yellow product of structure

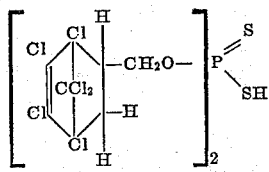

This was a stable almost odorless material. Analysis: Calculated for $C_{16}H_{11}O_2PS_2Cl_{12}$: P, 4.10; S, 8.48; Cl, 56.38; mol. wt., 755. Found: P, 4.10; S, 8.60; Cl, 56.10; mol. wt., 760.

*Example III*

To a solution of 198.6 grams (0.6 mole) of the product of Example I, and 48.33 ml. (0.6 mole) pyridine in 400 ml. toluene was added 20.72 ml. (0.2 mole) thiophosphoryl chloride dropwise at 75° C. The mixture was stirred at 110° C. for 18 hours, cooled and filtered from the pyridine hydrochloride. The filtrate was stripped in vacuo, the residue taken up in 400 ml. benzene plus 300 ml. hexane, filtered, and evaporated, giving 200 grams of a product of structure

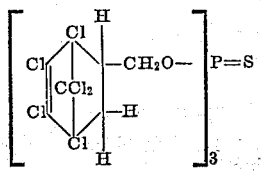

Analysis: Calculated for $C_{24}H_{15}O_3PSCl_{18}$: P, 2.95; S, 3.05; Cl, 60.30; mol. wt., 1051. Found: P, 2.80; S, 3.20; Cl, 60.40; mol. wt., 1090.

*Example IV*

A mixture of 22.62 grams of the product of Example II (0.03 mole) and 7.2 grams (0.03 mole) Armeen 16 D was stirred at 100° C. for 5 minutes, giving a very viscous brown oil analyzing 1.29% N, 2.82% P, 5.50% S and 39.63% chlorine, corresponding to the amine salt of the product of Example II.

*Example V*

A mixture of 15.1 grams of the product of Example II (0.02 mole) and 3.7 grams Armeen 12 D (0.02 mole) was stirred at 100° C. for 5 minutes, giving a viscous brown product analyzing 1.57% N, 2.97% P, 4.78% S and 42.0% chlorine.

The "Armeen 16D" and Armeen 12D" used in Examples IV and V are primary amines obtained by the reduction of nitriles resulting from the conversion of fatty acids from neutral fatty acid glycerides. Depending upon the fatty acid employed, the primary amines contain from 8 to about 18 carbon atoms. These primary amines are marketed by Armour and Company under the trade names "Armeen CD," "Armeen SD," "Armeen 8D," "Armeen 12D," "Armeen 16D," "Armeen 18D," etc. "Armeen CD" and "Armeen SD" are mixtures of primary amines prepared from coconut oil and soy bean oil, respectively, and the other "Armeens" are mixtures of primary amines containing predominantly the number of carbon atoms indicated in the trade name.

*Example VI*

A mixture of 37.7 grams (0.1 mole) product, Example II and 2.5 grams zinc oxide was stirred at 130° C. for 15 minutes, diluted with 75 ml. benzene, filtered, and evaporated on the steam bath, giving a solid Zn salt of the product of Example II. Analysis: Calculated for $C_{32}H_{20}O_4P_2S_4Cl_{24}Zn$: Cl, 54.04; S, 8.13; P, 3.94; Zn, 4.16. Found: Cl, 53.80; S, 7.85; P, 3.70; Zn, 3.97.

*Example VI-A*

Similarly, the lead salt of the product of Example II was prepared with lead carbonate. Analysis: Calculated for $C_{32}H_{20}O_4P_2S_4Cl_{24}Pb$: Cl, 49.50; S, 7.45; P, 3.61; Pb, 12.05. Found: Cl, 49.60; S, 7.90; P, 3.70; Pb, 10.90.

*Example VII*

A mixture of 145 ml. (0.91 mole) hexachlorocyclopentadiene and 102 grams (0.91 mole) 3-cyclohexene-1-methanol (B.P. 78° C. at 8 mm., obtained from Carbide and Carbon Chemicals Corp.) was heated at 130° C. for 40 hours, and then distilled. After all unreacted material was distilled over, 235 grams (67%) of a very viscous yellow liquid product boiling at 192–94° C. at 0.65 mm. was recovered. Analysis: Calculated for $C_{12}H_{12}Cl_6O$,

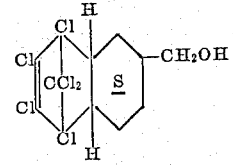

Cl, 55.30; mol. wt., 384.7. Found: Cl, 55.07; mol. wt., 381±5.

A mixture of 76.94 grams (0.2 mole) of the above product, 11.1 grams (0.05 mole) $P_2S_5$ and 100 ml. xylene was stirred at 130° C. until all of the $P_2S_5$ had reacted and the product then evaporated in vacuo. A 96% conversion of a viscous light brown product was obtained. Analysis: Calculated for $C_{24}H_{23}PO_2S_2Cl_{12}$

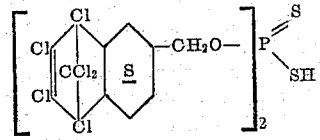

Cl, 49.30; S, 7.42; P, 3.59; mol. wt., 863. Found: Cl, 49.00; S, 7.63; P, 3.68; mol. wt., 850.

Example VIII

A mixture of 57.2 grams (0.4 mole) 3-cyclohexene-1,1-dimethanol (from Carbide and Carbon Chemical Corporation; B.P. 128° C. at 3 mm., M.P. 90–93° C.) and 64 ml. (0.4 mole) hexachlorocyclopentadiene was heated at 130° C. for 20 hours, then diluted with 300 ml. naphtha and cooled with scratching. There were crystallized from cyclohexane 151 grams (91%) of an adduct of the formula

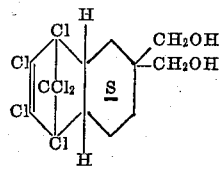

and having a melting point of 133° C. Analysis: Calculated for $C_{13}H_{12}Cl_6O_2$: Cl, 51.13; mol. wt., 412.7. Found: Cl, 50.90; mol. wt., 416.

Example IX

A mixture of 31.2 grams (0.0752 mole) adduct of Example VIII, 37 ml. toluene and 8.36 grams (0.0376 mole) $P_2S_5$ was stirred at 120° C. under reflux for 16 hours. All the $P_2S_5$ had reacted. The solution was treated with 50 ml. hexane and chilled, giving 32.1 grams (84%) of a product of the formula

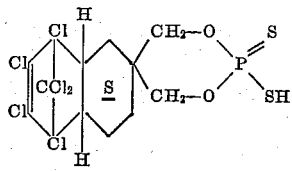

and having a melting point of 206–7° dec. Analysis: Calculated for $C_{13}H_{13}PS_2O_2Cl_6$: Cl, 41.60; P, 6.09; S, 12.57. Found: Cl, 41.40; P, 5.90; S, 12.50.

Example X

A mixture of 43 grams (0.5 mole) vinyl acetate and 80 ml. (0.5 mole) hexachlorocyclopentadiene was heated under reflux. The initial temperature of 92° C. rose steadily to 150° C. after 14 hours. The product was then distilled, giving 160 grams (89%) of a colorless viscous liquid boiling at 113° C. and 0.6 mm. which solidified to a crystalline mass, having a melting point of 44° C. Analysis: Calculated for $C_9H_7Cl_6O_2$: Cl, 59.18; mol. wt., 359.7. Found: Cl, 59.10; mol wt. 349.

A solution of 36 grams (0.1 mole) of the above vinyl acetate adduct in 75 ml. ethanol was stirred and refluxed with 50 ml. concentrated hydrochloric acid for 2 hours. The clear solution was poured into 600 ml. water and stirred with occasional scratching till the adduct solidified. A yield of 28.2 grams (92%) of white crystals melting at 155° C. was obtained from n-heptane. Analysis: Calculated for

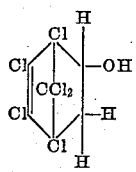

$(C_7H_4Cl_6O)$: Cl, 67.16; mol. wt., 316.7. Found: Cl, 67.00; mol. wt., 307.

A mixture of 50.51 grams (0.16 mole) of the above vinyl alcohol adduct, 8.88 grams (0.04 mole) $P_2S_5$ and 35 ml. toluene was stirred at 145° C. for 16 hours and the resultant product filtered and evaporated at 100° C. at 2 mm. pressure. 52 grams (96% conversion) of a light amber viscous product was obtained having the structure

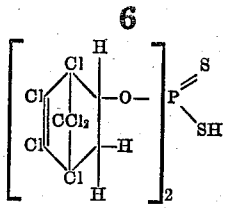

Analysis: Calculated for $C_{14}H_7Cl_{12}PS_2O_2$: Cl, 58.60; S, 8.83; P, 4.27; mol. wt., 725.4. Found: Cl, 58.80; S, 8.75; P, 4.15; mol. wt., 700

Example XI

A solution of 3627 grams (0.05 mole) of the above dithiophosphoric acid derivative of Example X and 4.9 grams (0.05 mole) maleic anhydride in 150 ml. isopropyl ether was refluxed for 16 hours; 1 ml. water was added, the mixture refluxed an additional 2 hours, and evaporated on the steam bath. The product was crystallized from a 1:4 benzene: n-heptane mixture to give 39.2 grams (93%) of a product having the formula

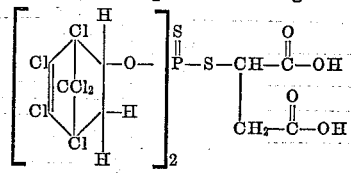

and melting at 143° C. Analysis: Calculated for $C_{18}H_{11}Cl_{12}PS_2O_6$: Cl, 50.52; S, 7.60; P, 3.68; mol. wt., 842. Found: Cl, 50.26; S, 7.83; P, 3.42; mol. wt., 835.

Example XII

A mixture of 63.14 grams vinyl alcohol adduct of Example X, 16.11 ml. (0.2 mole) pyridine, 100 ml. toluene, and 6.9 ml. (0.0667 mole) thiophosphoryl chloride was stirred at 110° C. for 26 hours, filtered through celite, and evaporated in vacuo, giving 58 grams (84%) of a viscous light brown liquid of the formula

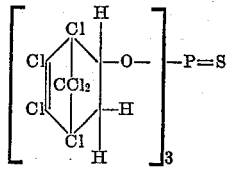

Analysis: Calculated for $C_{21}H_9Cl_{18}PSO_3$: Cl, 63.16; S, 3.17; P, 3.08. Found: Cl, 62.90; S, 3.08; P, 2.96.

Example XIII

A solution of 75.5 grams (0.1 mole) dithiophosphoric acid of Example II and 9.8 grams (0.1 mole) maleic anhydride in 300 ml. isopropyl ether was refluxed 24 hours; 2 ml. water was added, and the mixture refluxed another 2 hours, cooled, filtered, and evaporated, giving 68 grams (78%) of a light amber, very viscous product having the structure

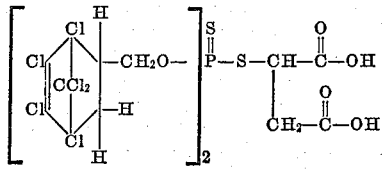

Analysis: Calculated for $C_{20}H_{15}PS_2O_6Cl_{12}$: Cl, 48.85; S, 7.35; P, 3.56; mol. wt. 871.4. Found: Cl, 48.60; S, 7.12; P, 3.31; mol. wt., 860.

The herein described thiophosphoryl derivatives can be employed in amounts of from about 0.05% to about 10% in lubricating base oils such as hydrocarbon oils, petroleum oils, synthetic hydrocarbon lubricating oils such as those obtained by the polymerization of hydrocarbons, and other synthetic lubricating oils such as alkylene oxide type oils, for example, the "Ucon Oils" marketed by Carbide and Carbon Corporation, polycarboxylic acid ester-type oils such as esters of adipic acid, sebacic acid, azelaic acid, etc. and other synthetic lubricating oils.

Lubricating oils containing the herein described thiophosphoryl derivatives exhibit excellent extreme pressure properties as demonstrated by the data in Table I. The Almen values were determined on the Almen Tester in the manner described in the Proceedings of the 15th Annular Meeting American Petroleum Institute 15, Sect. III, 60 (1934), or the Oil and Gas Journal 33, No. 26, 123, 126 (1934), or the SAE Extreme Pressure Method described in the S.A.E. Journal, 32, 402 (1933).

TABLE I

| Example No. | Con. Percent b | Almen Pass (lb.) | Almen Fail (lb.) | S.A.E. Conc. Percent b | S.A.E. Load Carried (lb.) |
|---|---|---|---|---|---|
| Control a | | 6 | 8 | | 60 |
| II | 0.50 | 30+ | | 2 | 250 |
|  | 0.25 | 24 | 26 | 3 | 310 |
|  | 0.10 | 16 | 18 | 4 | 400 |
| III | 2.00 | 22 | 24 | | |
| VI | 0.50 | 30+ | | | |
|  | 0.10 | 18 | 20 | | |
| VI-A | 0.50 | 30+ | | 2 | 245 |
|  | 0.25 | 22 | 24 | 3 | 255 |
| VII | 0.25 | 30+ | | | |
|  | 0.10 | 30+ | | | |
|  | 0.05 | 14 | 16 | | |
| IX | 0.25 | 30+ | | 2 | 255 |
|  | 0.25 | 30+ | | 3 | 245 |
| X | 0.10 | 18 | 20 | 4 | 310 |
|  | 0.20 | 30+ | | 1 | 324 |
|  | 0.10 | 30+ | | 2 | 378 |
| XI | 0.05 | 30+ | | | |
|  | 0.025 | 22 | 24 | | |
|  | 0.20 | 30+ | | 2 | 358 |
| XIII | 0.10 | 26 | 28 | | |
|  | 0.05 | 18 | 20 | | | a Solvent-extracted SAE 30 Oil.
b Concentration in (a).

The effectiveness of the herein described thiophosphoryl derivatives in inhibiting oxidation and the corrosion of copper and/or lead-containing metals, such as, for example, copper-lead alloys is demonstrated by subjecting lubricants containing the derivative to the following test.

A copper-lead test specimen is lightly abraided with steel wool, washed with naphtha, dried and weighed to the nearest milligram. The cleaned copper-lead test specimen is suspended in a steel beaker, cleaned with a hot trisodium phosphate solution, rinsed with water, acetone and dried, and 250 grams of the oil to be tested, together with 0.625 gram lead oxide and 50 grams of a 30-35 mesh sand charged to the beaker. The beaker is then placed in a bath or heating block and heated to a temperature of 300° (±2° F.), while the contents are stirred by means of a stirrer rotating at 750 r.p.m. The contents of the beaker are maintained at this temperature for twenty-four hours, after which the copper-lead test specimen is removed, rinsed with naphtha, dried and weighed. The test specimen is then replaced in the beaker and an additional 0.375 gram of lead oxide added to the test oil. At the end of an additional twenty-four hours of test operation, the test specimen is again removed, rinsed and dried as before, and weighed. The test specimen is again placed in the beaker together with an additional 0.250 gram of lead oxide and the test continued for another twenty-four hours (seventy-two hours total). At the conclusion of this time, the test specimen is removed from the beaker, rinsed in naphtha, dried and weighed. Acidity in terms of KOH per gram of oil product is also determined.

The loss in weight of the test specimen is recorded after each weighing.

This test, known as the Sand Stirring Corrosion Test, is referred to hereinafter as "SSCT."

The following products were subjected to the above test and results tabulated in Table II.

Product A—(Control) Solvent-extracted 30 SAE base oil+3.3% barium-containing neutralized reaction product of $P_2S_5$ and a polybutene of about 1000 molecular weight.
Product B—A+1.5% product of Example II.
Product C—A+2.0% product of Example II.
Product D—A+1.5% product of Example III.
Product E—A+1.5% product of Example VI.
Product F—A+1.5% product of Example VII.
Product G—A+1.5% product of Example X.

TABLE II

| Product | SSCT Acidity (mg. KOH g. oil) 48 Hours | 72 Hours | SSCT Corrosion (mg. wt. loss) 48 Hours | 72 Hours |
|---|---|---|---|---|
| A (Control) | 14.0 | 16.80 | 580 | 850 |
| B | 2.24 | 6.16 | 95 | 327 |
| C | 2.80 | 5.32 | 79 | 248 |
| D | 5.6 | 10.9 | 187 | 389 |
| E | 3.92 | 8.9 | 81 | 375 |
| F | 5.8 | 10.3 | 137 | 275 |
| G | 2.24 | 3.96 | 81 | 268 |

Since weight losses of 200 milligrams in 48 hours and 500 milligrams in 72 hours are permitted in the test, the corrosion inhibiting properties of the herein described thiophosphoryl derivative is clearly demonstrated by the above data.

While this invention has been described in connection with the use of the herein described additives and lubricant compositions, their use is not limited thereto but the same can be used in products other than lubricating oils, such as for example, fuel oils, insulating oils, greases, non-drying animal and vegetable oils, waxes, asphalts and fuels for internal combustion engines.

Concentrates of a suitable oil base containing more than 10%, e.g. from about 15% to about 50% or more, of the herein described thiophosphoryl derivatives, alone, or in combination with more than 10% of other additives, can be used for blending with other oils in proportions desired for the particular condition or use to give a finished product containing from about 0.05% to about 10% of the thiophosphoryl derivative.

Compositions containing the herein described thiophosphoryl derivative can contain other addition agents such as, for example, antioxidents, pour point depressors, V.I. improvers, etc.

Unless otherwise stated, percentages given herein and in the appended claims are weight percentages.

Although the present invention has been described with reference to specific preferred embodiments thereof, the invention is not to be considered as limited thereto, but includes within its scope such modifications and variations as come within the spirit of the appended claims.

I claim:

1. A lubricant composition comprising a major proportion of an oleaginous compound and from about 0.05% to about 10% of the total composition of a thiophosphoryl derivative selected from the group consisting of a derivative having the general formula

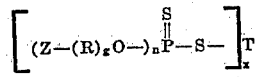

and a derivative having the general formula

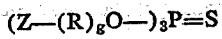

in which Z represents a hexachloro group selected from the class consisting of

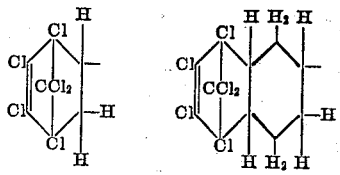

and

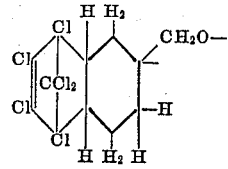

R is an alkylene radical of from 1 to 11 carbon atoms, $g$ is an integer of the group consisting of 0 and 1, $n$ is an integer of the group consisting of 1 and 2, T is a constituent selected from the group consisting of hydrogen, a metal, a primary amine radical of from about 8 to about 18 carbon atoms, and the succinic acid radical

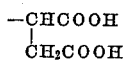

and $x$ is an integer equivalent to the valence of T.

2. A lubricant composition comprising a major proportion of an oleaginous compound and from about 0.05% to about 10% of the total composition of a thiophosphoryl derivative having the formula

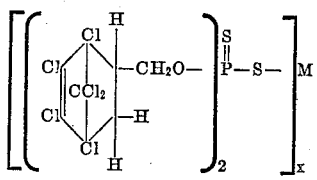

wherein M is a polyvalent metal, and $x$ is an integer equivalent to the valence of M.

3. The lubricant composition of claim 2 wherein M is zinc, and $x$ is 2.

4. A lubricant composition comprising a major proportion of an oleaginous compound and from about 0.05% to about 10% of the total composition of a thiophosphoryl derivative having the formula

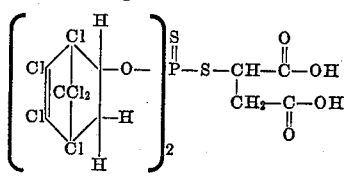

5. A lubricant composition comprising a major amount of a lubricating oil and from about 0.05% to about 10% of the total composition of a thiophosphoryl derivative selected from the group consisting of a derivative having the general formula

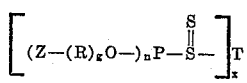

and a derivative having the general formula

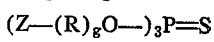

in which Z represents a hexachloro group selected from the class consisting of

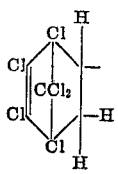

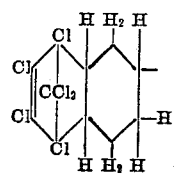

and

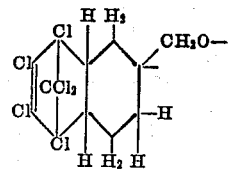

10. R is an alkylene radical of from 1 to 11 carbon atoms, $g$ is an integer of the group consisting of 0 and 1, $n$ is an integer of the group consisting of 1 and 2, T is a constituent selected from the group consisting of hydrogen, a metal, a primary amine radical of from about 8 to about 18 carbon atoms, and the succinic acid radical

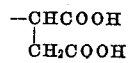

and $x$ is an integer equivalent to the valence of T.

6. A lubricant composition comprising a major proportion of a lubricating oil and from about 0.05% to about 10% of the total composition of a thiophosphoryl derivative having the formula

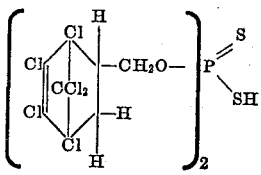

7. A lubricant composition comprising a major proportion of a lubricating oil and from about 0.05% to about 10% of the total composition of a thiophosphoryl derivative having the formula

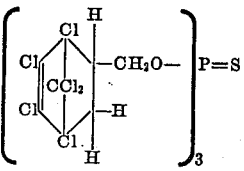

8. A lubricant composition comprising a major proportion of a lubricating oil and from about 0.05% to about 10% of the total composition of a thiophosphoryl derivative having the formula

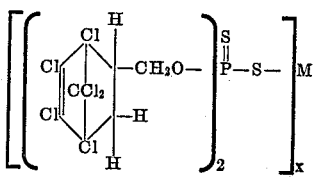

wherein M is a polyvalent metal, and $x$ is an integer equivalent to the valence of M.

9. The lubricant composition of claim 8 in which M is zinc and $x$ is 2.

10. A lubricant composition comprising a major proportion of a lubricating oil and from about 0.05% to about 10% of the total composition of a thiophosphoryl derivative having the formula

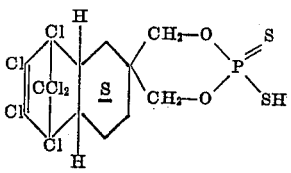

11. A lubricant composition comprising a major proportion of a lubricating oil and from about 0.05% to about 10% of the total composition of a thiophosphoryl derivative having the formula
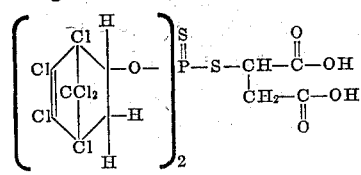
12. A lubricant composition comprising a major proportion of a lubricating oil and from about 0.05% to about 10% of the total composition of a thiophosphoryl derivative having the formula
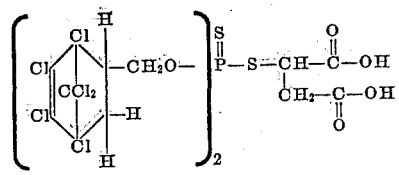
No references cited.